Figures 1, 2, 3:

(No Model.) 2 Sheets—Sheet 1.

J. ADLER & J. A. CHASE.
GAME APPARATUS.

No. 512,144. Patented Jan. 2, 1894.

WITNESSES:
INVENTORS
BY
ATTORNEY.

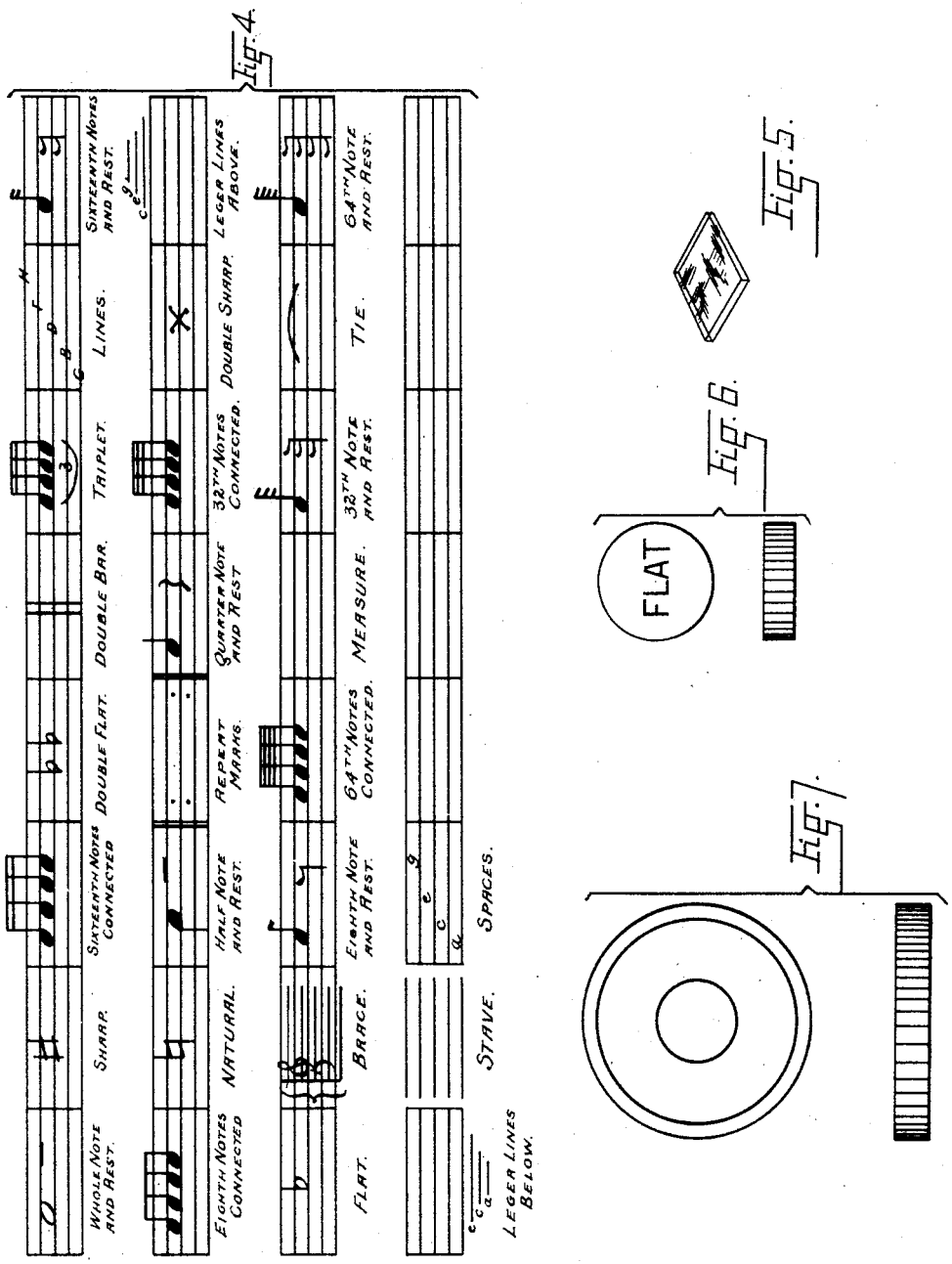

United States Patent Office.

JOSHUA ADLER AND JOHN A. CHASE, OF DENVER, COLORADO.

GAME APPARATUS.

SPECIFICATION forming part of Letters Patent No. 512,144, dated January 2, 1894.

Application filed May 12, 1893. Serial No. 473,952. (No specimens.)

*To all whom it may concern:*

Be it known that we, JOSHUA ADLER and JOHN A. CHASE, citizens of the United States of America, residing at Denver, in the county of Arapahoe and State of Colorado, have invented certain new and useful Improvements in Game Apparatus; and we do declare the following to be a full, clear, and exact description of the invention, such as will enable others skilled in the art to which it appertains to make and use the same, reference being had to the accompanying drawings, which form a part of this specification.

Our invention relates to an improved game apparatus, and has for its object the teaching of the rudiments of music while playing an amusing game. As it is more especially designed for the young, it is called the kindergarten of music, though it will be found interesting to persons of all ages.

The means employed in playing the game consist of thirteen cards upon which are printed the major and minor musical scales in both clefs and the names of the principal characters employed in writing music, together with blocks, transparent pieces, and hoodoo cards. These last named cards introduce an amusing feature into the game. The blocks have printed upon one face, the names of the notes and the characters found on the cards. In playing the game, the blocks are all put together in a suitable receptacle, as a small sack or bag which one of the players holds. The blocks are drawn singly and by chance from the receptacle and their names announced. The person holding the card, or cards, having the note or character corresponding with the name on the block places one of the transparent pieces on his card and over the printed note or character whose name is called. Each player may take as many cards as desired but it is recommended that this number never exceed three, while beginners should not be allowed more than one. It will thus be seen that any number of persons, not exceeding thirteen, may play the game. The transparent pieces should be placed together in such a position that they are easily reached by all the players. The player who first succeeds in covering all the notes and characters on his card, or cards, with the transparent pieces, wins the game.

The name "Hoodoo" is printed on one or more of the blocks. A guide block is employed in playing the game and is moved from one player to the other as often as each named block is drawn. The person who has the guide block in front of him when the hoodoo block is drawn, is decorated with a card upon which is printed a face of grotesque appearance. We prefer to employ two of these cards and a corresponding number of hoodoo blocks. When the second block is drawn, the person having the guide block before him must be decorated with both hoodoo cards, the first person wearing the card being then relieved of this ornamental appendage. This brief explanation is intended to give a general idea of the game, which, however, will be better understood by reference to the accompanying drawings in which—

Figure 1 shows the treble clef face of the card No. 1; Fig. 2, the base clef face of card No. 2; Fig. 3, one of the hoodoo cards; Fig. 4, the characters employed on the cards; Fig. 5, one of the transparent pieces; Fig. 6, one of the named blocks, and Fig. 7, the "guide" block.

The cards are numbered on both sides from one to thirteen respectively. The thirteen diatonic scales, both major and minor, are shown on one side of these cards in the treble clef, and on the reverse side, in the bass clef.

As shown in Figs. 1 and 2, the scale is illustrated on the upper portion of the card, the names of the notes being placed below the staff. The fingering employed in playing the scale on the piano or organ is indicated above the staff, the cross designating the thumb and the numbers the corresponding fingers. Above the designation of the fingering is printed the name of the major scale and its relative minor scale. Below the scale and lying parallel with the staff, is another staff somewhat reduced in size upon which is written a number of the principal characters employed in writing music, while below the staff, and directly beneath the corresponding characters, the names of the characters are printed. As shown in the drawings, six of these characters are placed on each face of each card. Hence the same character must be repeated and this may occur as often as necessary, and the characters may be arranged on the cards as desired, no particular order being necessary. All the characters used on the cards are illustrated in Fig. 4. On the lower portion of the staff is printed a third staff which is not used in playing the game but which is intended as an exercise in music, giving the players an opportunity of practicing on an instrument, what they have learned in playing the same. It will be observed that on this staff, in addition to the ascending scales, the descending scales, their fingering and the chord notes, arranged for practical use for the piano or organ, are added.

In playing the game, the following rules should be observed, which it is thought advisable to incorporate in the specification. One of the players should be appointed as leader who shall bear the title of professor.

The professor will give an equal number of cards to each player and lay the glass or transparent squares or pieces on the table within convenient reach of all the players and will place the hoodoo cards on the table face downward, while the checker, or hoodoo guide, is placed in front of the leader's cards. The professor then takes the bag containing the blocks and after shaking the same thoroughly, draws one block therefrom and calls out the name printed thereon. The corresponding note or character so called out, if found on any player's cards, is covered with one of the transparent pieces as many times as it occurs. The block is now laid upon the table face up and the hoodoo guide moved in front of the next player to the left. The leader then draws another block from the bag and so on throughout the game. After each draw the hoodoo guide passes to the next player to the left. If a hoodoo block is drawn from the bag, the player in front of whose cards the guide is at the time of the draw, will be decorated with a hoodoo medal (that is, one of the hoodoo cards) by the professor. If the second hoodoo block should be drawn. the same rule shall apply, in addition to which, however, the player who received the first is relieved of the same since it is transferred to the person last decorated, who wears both medals to the close of the game.

If the professor should be decorated with a hoodoo medal, the title "Professor Hoodoo" should be bestowed and used in addressing him throughout the game.

When all the notes and characters on any one card are covered with the glass squares, the game is completed and the winner calls "out." At the conclusion of the game, the cards can be retained for the next game or exchanged, as suits the pleasure of the players. The bag containing the blocks passes to the next player to the left who shall be the professor during the game. When the winner calls "out," the professor replies "Name winning scales and characters." The winner will then read aloud the name of the winning scale and its relative minor scale and the name of each note, beginning with the lowest, and also the names of the characters on the winning card. If two players should win at the same time, thus resulting in a tie game, those players may continue to play the game exclusively until one of them succeeds in covering another card. The observance of this rule, however, is subject to the pleasure of the players.

The game may be divided into sub-games according to the progress of the players. These games may be known as sub-games A, B, C, D, E, F and G. In game A, major scales, treble clef only, are used; in game B, minor scales, treble clef only; sub-game C, major and minor scales combined, treble clef; sub-game D, major scales, bass clef; sub-game E, minor scales, bass clef; sub-game F, major and minor scales combined, bass clef; sub-game G, treble and bass clef combined. The last game to be played by advanced players only, is termed the game of chords, in which only chord notes should be covered.

A book giving complete instructions for playing the game will accompany each set of cards.

Having thus described our invention, what we claim is—

1. In a game apparatus, the combination of a number of cards upon which are formed different musical scales or musical characters, one or more cards having grotesque representations thereon and termed "hoodoo" cards, a guide block, and other blocks upon which are designated the names of all the notes or characters formed on the cards, and a block for each hoodoo card upon which the name "Hoodoo" is formed, substantially as described.

2. In a game apparatus, the combination of a number of cards upon which are formed different musical scales, one or more cards having grotesque representations and termed "hoodoo" cards, a guide block or hoodoo guide, other blocks upon which are designated the names of all the notes in the scales formed on the cards, and a block for each hoodoo card upon which is formed the name "Hoodoo," and a number of transparent pieces, substantially as described.

In testimony whereof we affix our signatures in the presence of two witnesses.

JOSHUA ADLER.
JOHN A. CHASE.

Witnesses:
J. B. WILLSEA,
CHAS. E. DAWSON.